United States Patent [19]

New

[11] Patent Number: 5,863,133

[45] Date of Patent: Jan. 26, 1999

[54] VERTICAL BEARING ASSEMBLY LUBRICATION

[75] Inventor: Nigel H. New, Harrow, England

[73] Assignee: The Glacier Metal Company Limited, England

[21] Appl. No.: 849,190

[22] PCT Filed: Nov. 24, 1995

[86] PCT No.: PCT/GB95/02757

§ 371 Date: May 27, 1997

§ 102(e) Date: May 27, 1997

[87] PCT Pub. No.: WO96/18066

PCT Pub. Date: Jun. 13, 1996

[30] Foreign Application Priority Data

Dec. 6, 1994 [GB] United Kingdom .................... 9424592

[51] Int. Cl.[6] ...................................................... F16C 17/02

[52] U.S. Cl. ............................................................ 384/114

[58] Field of Search ................................... 384/118, 114, 384/111, 107, 373

[56] References Cited

U.S. PATENT DOCUMENTS 1,460,353   6/1923   Williamson .

FOREIGN PATENT DOCUMENTS 1177187   5/1957   France .
434054   of 1935   United Kingdom .

Primary Examiner—Lenard A. Footland
Attorney, Agent, or Firm—Nixon & Vanderhye P.C.

[57] ABSTRACT

This invention relates to vertical bearing assemblies employed to support vertically extending rotatable shafts and provide thrust and/or journal bearing support therefor, and in particular relates to lubricant arrangements therefor.

9 Claims, 4 Drawing Sheets

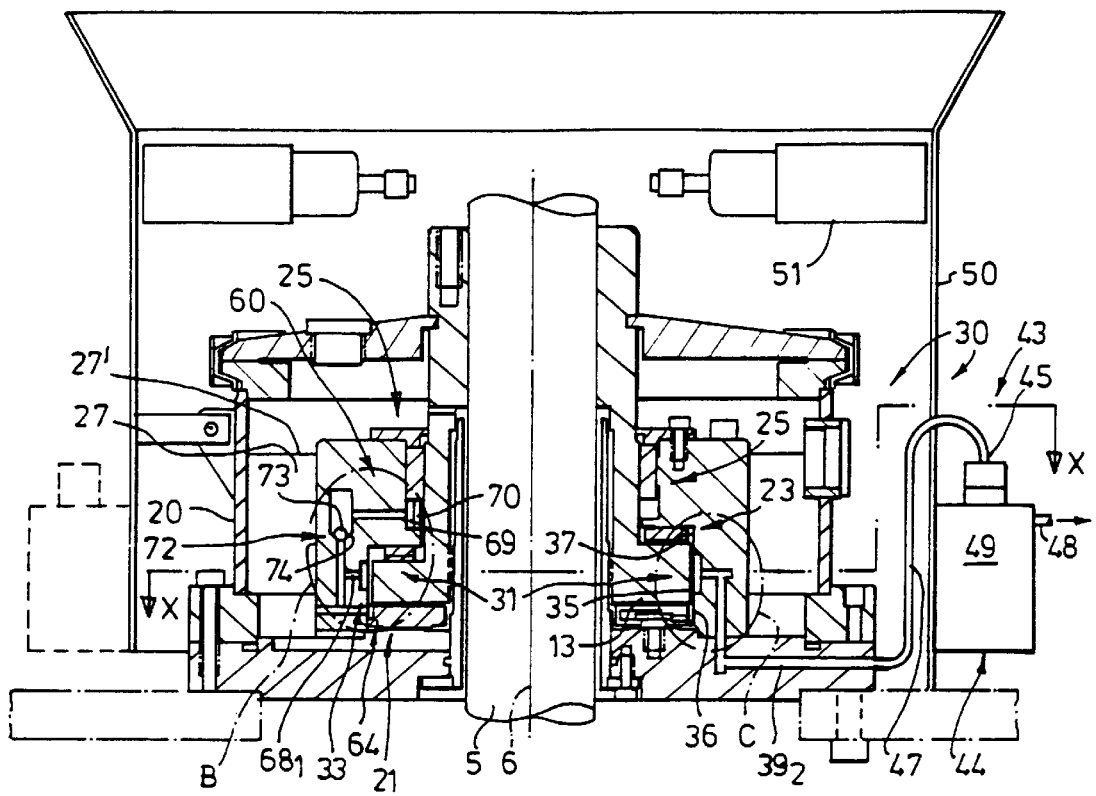
FIG.2(a)
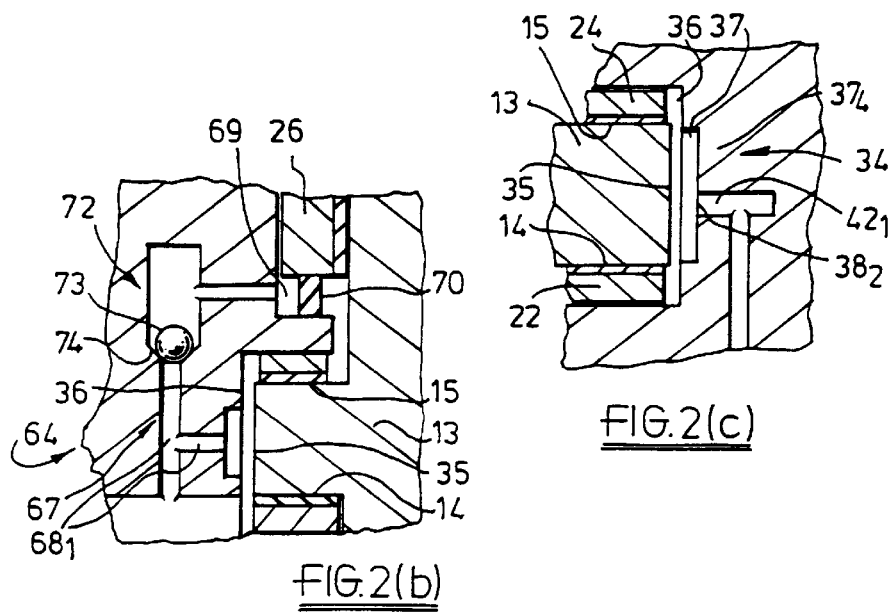
FIG.2(b)
FIG.2(c)

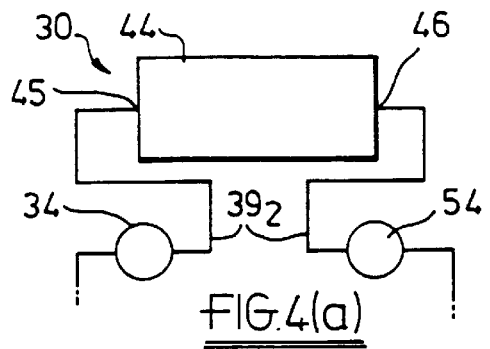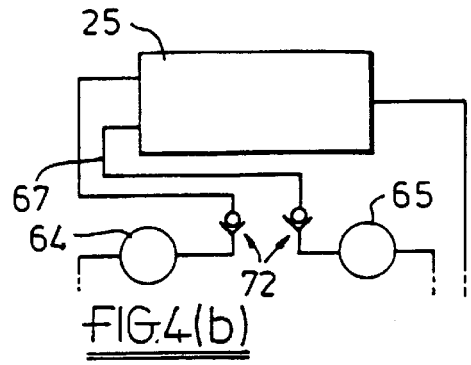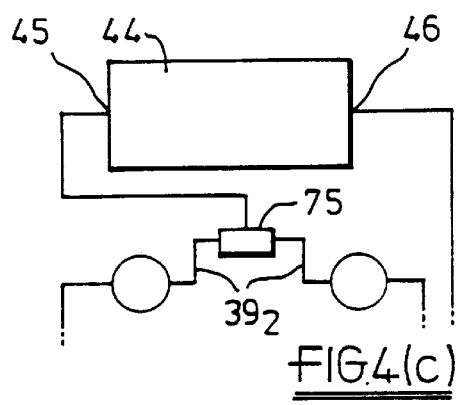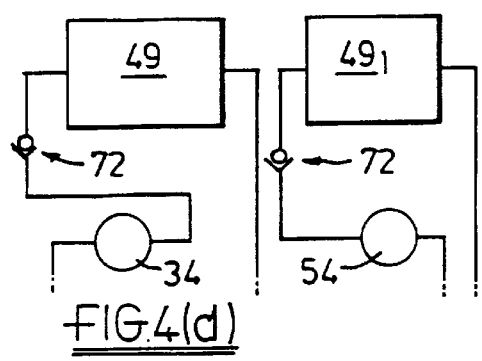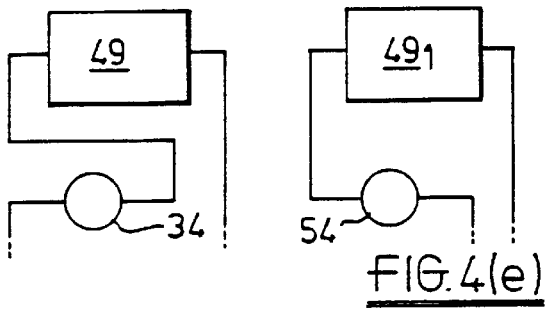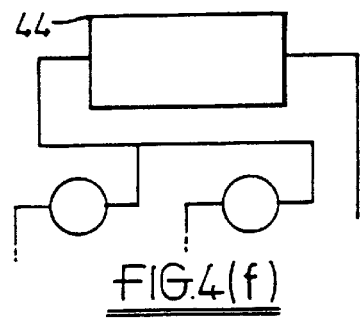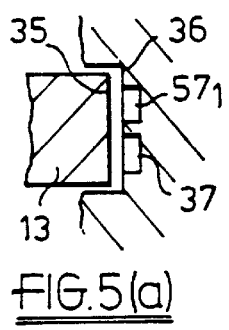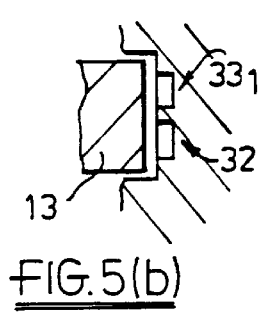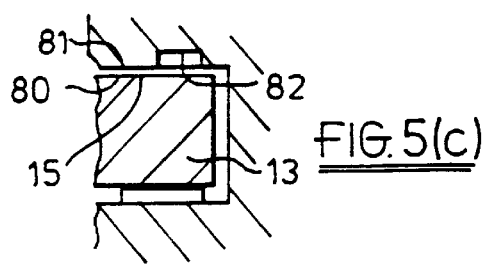

VERTICAL BEARING ASSEMBLY LUBRICATION

This invention relates to vertical bearing assemblies employed to support vertically extending rotatable shafts and provide thrust and/or journal bearing support therefor, and in particular relates to lubricant arrangements therefor.

A vertical bearing assembly of known form, employed to support a vertical shaft which is capable of being rotated about its longitudinal axis in either rotational direction, is illustrated in sectional elevation in FIG. 1.

A shaft 5 having longitudinal axis 6 is suspended from its upper end 7 by a vertical bearing assembly shown generally at 10. The bearing assembly comprises a collar 11 surrounding the end 7 of the shaft and rotatable with the shaft as a rotor part, which collar has an axially extending part 12 and a radially enlarged flange 13 to define radially extending, axially directed faces 14 and 15. The bearing assembly also comprises a stator housing 20 which surrounds the collar 11 and contains other stator parts of the assembly.

The bearing assembly comprises several bearing parts contained within the housing and is shown comprising a main thrust bearing part 21, in the form of a ring of bearing pads 22 carried by the stator arrayed about the shaft to support the shaft by way of the face 14 of the collar flange, a reverse thrust bearing part 23, in the form of a ring of small bearing pads 24 supported by the structure to engage with the flange face 15, and a journal bearing part 25, in the form of a plurality of bearing pads 26 carried by the stator and arrayed about the axially extending part 12 of the collar.

The bearing parts are of conventional bearing material, such as white metal on a backing metal, and operate with an intervening film of liquid lubricant, formed by filling the housing with lubricant 27 to a level 27' above the highest bearing part, that is, with the bearing parts totally immersed in a bath of the lubricant. The bearing pads are also mounted such that they have a limited degree of tilt to permit the lubricant film to adopt a wedge-like thickness due to hydrodynamic forces during rotation and to accommodate minor misalignment between the shaft and stator.

The total immersion of the bearing surfaces within the lubricant ensures that a hydrodynamic film is available at all times without priming; the bearing assembly is thus fully contained within the housing and for this reason is sometimes referred to as being of the vertical self-contained type.

Notwithstanding that the housing parts are totally immersed in a bath of lubricant, reliance on the lubricant and its inherently low pressure head and poor extraction of heat means that the power envelope of such bearing assembly is limited and determined to a significant extent by the thermal properties of the lubricant. In particular, although lubricant is moved through the bearing parts to some extent by the shaft rotation and viscous drag on the lubricant film, the rate of flow and/or hydrodynamic pressure is limited by shaft rotation speed and lubricant temperature in the vicinity of the bearing parts. Heat generated at the bearing parts limits the speed at which the shaft can be rotated and/or the load carried by the shaft unless the heat is removed from the bearing parts by way of the lubricant of the bath and/or stator and housing structure.

The structure of the stator inhibits convection currents within the lubricant from adequately distributing it through the bath.

It is known to provide heat exchange pipes within the bath of lubricant and through which a coolant is caused to flow to extract heat from the bath of the lubricant, and indicated by ghosted lines 28.

It is known alternatively to provide the housing with external fins $29_1$ or the like and to dispose the whole housing in a ducted stream of cooling fluid, such as air forced to flow over the fins by a fan $29_2$ carried at the end of the shaft or collar, or to surround the housing with a water jacket.

However, such known arrangements of influencing the power envelope of the bearing assembly by influencing the behaviour and functionality of the lubricant depend upon transfer of heat through the lubricant of the bath which, notwithstanding the limited degree of fluid movement within the bearing parts, is essentially stagnant and presents a poor conductor.

Bearing parts of such an assembly may benefit in respect of their performance by forced lubrication at increased lubricant supply pressure, although in the long term extraction of heat efficiently from the lubricant bath remains a problem. Likewise forcing the lubricant from the housing by an exterior pump to extract heat is possible but in both instances, the concept of the self-contained bearing is lost by interfacing with additional external elements and the costs are significant.

Although FIG. 1 shows a specific form of self-contained vertical bearing assembly comprising thrust, reverse thrust and journal bearing parts, it will be appreciated that such an assembly may comprise fewer such parts and/or exhibit a different relative disposition with respect to the shaft. In this specification a vertical bearing assembly is defined as a bearing assembly comprising one or more bearing parts disposed in relation to a shaft rotatable about a vertically aligned longitudinal axis, said assembly comprising a rotor part carried by the shaft and a stator part surrounding the rotor part and containing a bath of lubricant for parts of the bearing assembly.

There are other bearing assemblies which differ in detail but illustrate the use of a lubricant pump integrated with the vertically mounted shaft.

U.S. Pat. No. 1,460,353 describes apparatus having vertical shaft supported by vertically separated thrust and journal bearings through which lubricating oil trickles by gravity, there being a lower collecting bath below the journal bearing and an upper bath in which the thrust bearing sits. Within the lower bath are viscosity pump elements formed by blocks having varying depth slots and biased into contact with a shroud surrounding the shaft, which pump elements lift oil from the lower bath to the upper bath by way of a cooling coil disposed within air forced through the apparatus.

GB-A-434-054 describes apparatus having a vertically disposed shaft supported in upper and lower bearings, the lower bearing being submerged within a bath of lubricating oil and the upper bearing being force lubricated by oil from the bath delivered by means of a viscosity pump formed, in the lower bearing, by a circumferential groove of uniform width and depth created in the bearing surface over a majority of its circumferential length.

FR-A-1177187 describes a vertical bearing lubrication system in which a pair of viscosity pumps are formed between a shroud encircling and rotating with the shaft and a static, tapered surface spaced from the shroud by a varying distance, defining therebetween a Bi-tapering gap through which liquid is drawn to increase delivery pressure irrespective of direction of shaft rotation.

It is an object of the present invention to provide for a vertical bearing assembly a lubrication arrangement of simple and compact construction that permits improvement in the total power envelope of the assembly.

According to the present invention, there is provided a bearing assembly for a vertically oriented shaft including a lubrication arrangement, the bearing assembly comprising a housing containing a rotor part carried by the shaft and a stator part surrounding the rotor part, one or more bearing parts formed between the rotor and stator parts, the lubrication arrangement comprising a bath of lubricant for the bearing parts, viscosity pump means comprising at least one viscosity pump set and each set comprising at least a first viscosity pump defined by a rotor surface of the assembly submerged in the lubricant and a facing submerged stator surface containing a first surface recess extending part way about the rotor axis between first and second ports located at opposite end regions of the recess, whereby rotation of the rotor relative to the stator surface entrains lubricant to flow in the direction of rotation between a leading one of the first and second ports and a trailing one of the first and second ports, and, associated with each viscosity pump set, first duct means extending between the first port of each pump and an opening submerged in the lubricant bath and second duct means extending between the second port of each pump and lubricant utilization means, the facing rotor and stator surfaces being non bearing surfaces spread apart submerged in the lubricant by a substantially fixed distance in excess of the thickness of a hydrodynamic, load bearing film of the lubricant.

The lubricant utilisation means may comprise a heat exchanger means having lubricant port means and coolant inlet and outlet means. Such heat exchanger means is preferably disposed without the housing. Alternatively or additionally the lubricant utilisation means may comprise a force lubricated bearing part of the bearing assembly.

Given that it is common for shafts suspended by such vertical bearing assemblies to rotate in either direction at least one viscosity pump set may comprise also a second viscosity pump, defined by said submerged rotor surface and part of said facing submerged stator surface containing a second surface recess therein extending between first and second ports located at opposite end regions of the recess whereas rotation of the rotor relative to the stator surface entrains lubricant to flow in the direction of said rotation between a leading one of said first and second ports and a trailing one of said first and second ports, and said first duct means extends between said first port of the second pump and an opening submerged in the lubricant and said second duct means extends between said second port and lubricant utilisation means, said recess ports of the pumps being disposed with respect to each other such that a particular rotational direction of the rotor defines as the leading ports of the pumps the first recess port of one pump and the second recess port of the other pump.

Depending upon the nature of the lubricant utilisation means and its coupling with the duct means, the viscosity pumps of a set may work individually or together, in parallel or tandem irrespective of the direction of shaft rotation or each pump may be isolated by one-way valve means or the equivalent such that it is effective for a particular direction of shaft rotation only.

The viscosity pump means may comprise two such pump sets each set being associated with a different form of lubricant utilisation means; one viscosity pump set being associated with heat exchanger means and the other pump set being associated with forced lubrication of a bearing part of the assembly.

BRIEF DESCRIPTION OF THE DRAWINGS

Embodiments of the invention will now be described by way of example with reference to the accompanying drawings, in which.

Figure 1:
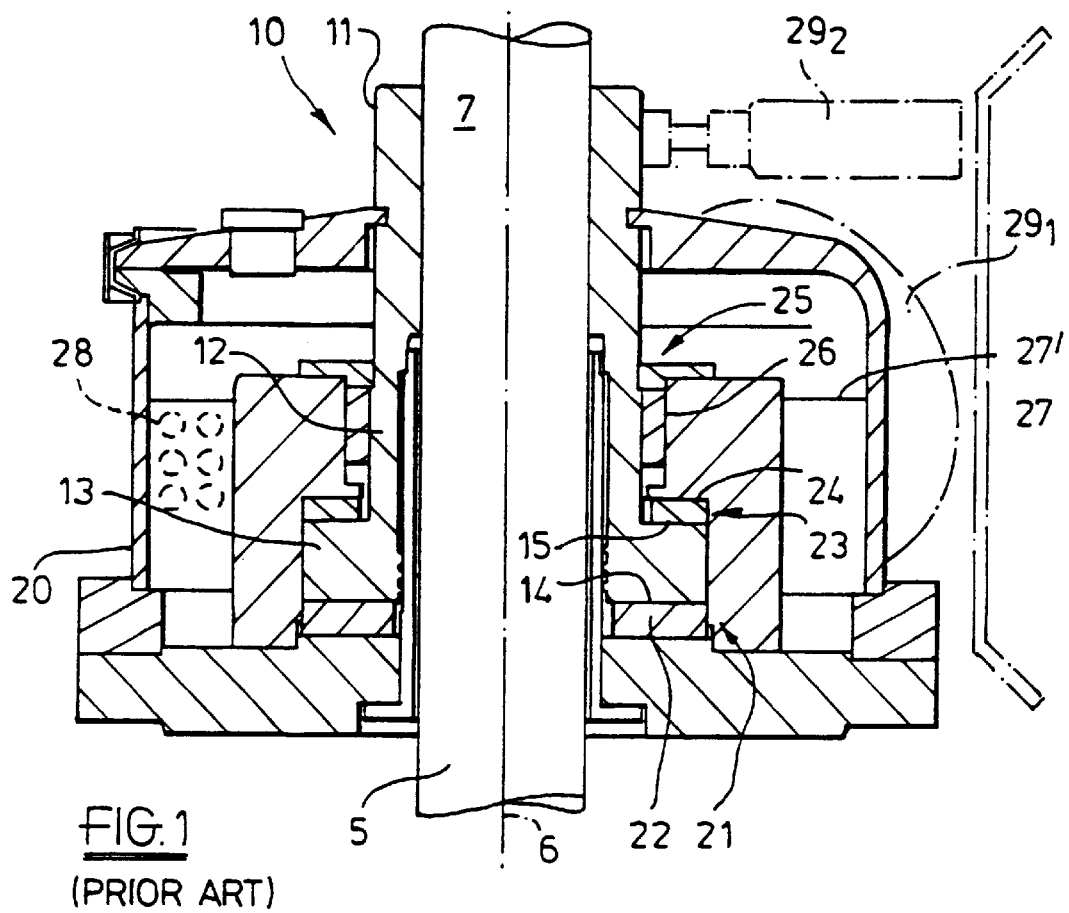
FIG. 1 described hereinbefore, is a sectional elevation through a known form of self-contained vertical bearing assembly for a shaft capable of rotation in either direction about its longitudinal axis and showing, in addition to a bath of lubricant formed within an assembly housing, different forms of heat exchanger means for removing heat from the bath of lubricant, FIG. 2($a$) is a sectional elevation through the assembly of FIG. 3, along the line Y—Y thereof, and including a lubrication arrangement that includes viscosity pump means and lubricant utilisation means in the form of heat exchanger means external to the housing, and also forced lubrication to a journal bearing of the assembly, FIGS. 2($b$) and 2($c$) are enlargements of the regions B and C respectively of FIG. 2($a$) simplified to illustrate relevant features.

The lubrication arrangement comprises the housing 20 which forms a reservoir for a quantity of liquid lubricant 27, typically mineral oil, sufficient to submerge the bearing parts beneath the lubricant surface 27'. The lubricant thus forms a bath in which the bearing parts are immersed. In addition to the housing and bath of lubricant, the arrangement also comprises viscosity pump means indicated generally at 31 comprising in this embodiment a first viscosity pump set 32 and second viscosity pump set 33. The first viscosity pump set 32 comprises at least a first viscosity pump 34, defined by a rotor surface 35 submerged in the reservoir and a facing submerged stator surface 36 containing a first surface recess 37 extending part way about the rotor axis 6, between end regions $37_1$, $37_2$ of the recess at which are located first and second ports $38_1$ and $38_2$ respectively. The rotor surface 35 comprises an axially extending periphery of the flange 13 that otherwise provides the thrust faces 14 and 15 and is the radially outermost part of the collar 11 which, for any particular angular speed of the shaft, has maximum linear speed relative to the stator surface 36 and recess 37 which faces it.

The surfaces 35 and 36 have no bearing function and thus are separated to avoid contact between them, typically of order of 1 mm clearance. However, the surfaces and recess are submerged beneath the surface of the lubricant bath and are permanently primed with lubricant such that the recess 37 forms a pumping chamber and as the rotor surface rotates with respect to the stator surface it entrains lubricant to flow along the recess in the direction of the rotation between a leading one of the ports and a trailing one, that is, between ports $38_1$ and $38_2$ for the clockwise rotation shown in FIG. 3.

The first viscosity pump 32 has associated with it first duct means $39_1$, comprising a duct $40_1$ extending between the first port $38_1$ and an opening $41_1$ submerged below the surface of the lubricant bath, and second duct means $39_2$, comprising a duct $42_1$ extending between the second port $38_2$ and lubricant utilisation means included generally at 43.

The lubricant utilisation means comprises heat exchanger means 44 having lubricant port means 45, 46 and coolant inlet and outlet means 47, 48. In the form illustrated, it comprises a finned multiple-tubed or serpentine-tubed, core 49 through which lubricant circulates between port means 45 and 46, and is disposed without the housing but within an air duct 50 surrounding the housing and through which air is forced by fan 51 mounted on the collar 11 or shaft 5, the finned surface of the core 49 defining at each side thereof the coolant inlet and outlet means 47 and 48.

The first viscosity pump set 32 also comprises a second viscosity pump 54 which comprises a second recess 57 in the stator surface 36 extending about the rotor axis in series with the recess 37 at the same vertical level facing rotor surface 35. The second recess 57 has end regions $57_1$ and $57_2$ at which open first and second ports $58_1$ and $58_2$ respectively. First duct means $39_1$ includes a duct $40_2$ extending from first port $58_1$ to an opening $41_2$ submerged below the surface of the lubricant bath, like opening $41_1$. The second duct means $39_2$ includes a duct $42_2$ extending from the second port $58_2$ to the heat exchanger means 44.

The second viscosity pump of the set is identical to the first in that a clockwise shaft rotation defines the second port $58_2$ as a leading port and the first port $58_1$ as a trailing port. It will be appreciated that if and when the shaft rotates in an opposite, counter clockwise, direction the ports $38_2$ and $58_1$ become leading ports and the ports $38_1$ and $58_2$ becomes trailing ports.

Each viscosity pump, of which viscosity pump 34 is typical, is formed with a pumping chamber recess 37 of substantially uniform width and depth in a central part $37_3$ between end regions $37_1$ and $37_2$, but is, the recess base $37_4$ extends parallel to stator surface 36 and the side walls of the recess are substantially perpendicular to the stator surface 36. The end regions $37_1$ and $37_2$ whose function is to direct fluid between the leading and trailing ports (as defined by shaft rotation direction) and separate it from the fluid constrained to flow with the rotor surface across the stator surface 36, conveniently each comprise an arc of a circle, but clearly more complex and efficient shapes could be implemented if the bearing assembly structure supports them, as discussed hereinafter.

As mentioned above, the viscosity pumps 34 and 54 of the first set are disposed at the same vertical height and are of the same dimensions such that they pump at substantially the same rate. The recesses 37 and 57 are disposed end to end in series about the rotor axis. For reasons which will become apparent, the viscosity pump set 32 is confined to an angular extent of 180° about the rotation axis, each pump recess therefore extending for less than 90°, but preferably not significantly less than 70°. A minimum length in a circumferential direction is considered to be about 100 mm.

The viscosity pump set is therefore provided by making only minor modifications to the structure of a known bearing assembly and utilises surfaces thereof having no other function. Particularly, and unusually for a viscosity pump which makes use of bearing lubricant, it is not found in a bearing surface which has hydrodynamic bearing pressures and a compromise between the provision of stator recess and absence of bearing surfaces found at said stator recess, although if desired, such viscosity pump could be formed in the manner shown if the stator surface 33 were a bearing surface supporting rotor surface 35 as discussed hereinafter.

In addition to the relative simplicity with which the arrangement may be incorporated into a known design of bearing assembly without major redesign of the latter, each viscosity pump means may be defined simply with low criticality of dimensions and surface forms in view of its submerged location and the efficiency of lubricant pick-up from the bath in the permanently primed state that then exists, notwithstanding compromised efficiency in other areas that would at first sight seem to militate against the use of the adopted form.

It is well known that lubricant is caused to move along the pumping chamber recess of a viscosity pump by the turbulence associated with proximity to the rotor surface and that the delivery pressure is a function of rotor speed and recess length (if below a minimum value of about 100 mm) whereas the delivery rate is a function of rotor speed and effective cross-sectional area of the recess, provided that a maximum depth is not exceeded beyond which circulation within the recess destroys a pumping action. Thus the effective cross-sectional area is determined largely by its width.

Thus in the above described bearing assembly structure, when the dimensions circumferentially about, and axially along, the rotor-stator interface are fixed and the shaft can rotate in both directions, cooling of the lubricant is achieved by passing it through heat exchanger means 46 at a flow rate which takes precedence over delivery pressure; that is, each viscosity pump is of maximum recess width in the axial direction at the expense of being relatively short circumferentially.

The above construction also compromises efficiency in another respect. Whereas the viscosity pump inherently functions for either direction of rotor rotation, it is found with such a significant clearance between rotor and stator surfaces that if there is significant resistance to lubricant being drawn into the pumping chamber recess by way of the leading port then lubricant tends to be drawn into the recess from the clearance, from the turbulent flow associated with the rotor surface, and proper flow rate is reduced significantly.

Thus in the bidirectional rotor assembly, it is appropriate to try to maximise flow rate whilst accommodating bidirectional rotation by using both pumps of the set for both rotation directions whilst if possible avoiding a large suction resistance.

To this end, in the embodiment shown, the second duct means $39_2$ extends between, and couples, both lubricant port means of the heat exchanger to the viscosity pump set. The duct $42_1$ is connected to the first lubricant port means 45 and duct $42_2$ is connected to the second lubricant port means 46 such that notwithstanding shaft rotation direction, lubricant is drawn from the bath by the leading port of one viscosity pump of the set, delivered to the core of the heat exchanger means, and then drawn from the heat exchanger means and delivered by the trailing port of the other pump of the pair to the bath.

In the arrangement 30 the lubricant utilising means 43 comprises in addition to heat exchanger means 44, a forced lubrication arrangement 60 shown in relation to the journal bearing part 25 and associated with second viscosity pump set 33 of the viscosity pump means 31. The viscosity pumps 64 and 65 which comprise the set are substantially identical to the first and second pumps 34 and 54, the stator recesses thereof being of the same length and in series at substantially the same vertical position in the stator surface 36 and facing rotor surface 35. The first port of each viscosity pump 64 and 65 is coupled by way of first duct means 66 to open into the lubricant bath. The second port of each pump is coupled by way of second duct means 67 comprising duct $68_1$ and duct $68_2$ to an annular gallery 69 which comprises a manifold providing access to the journal bearing pads 26 but is sealed from direct contact with the bath by seal 70.

The bearing part 25 thus comprises a lubricant utilisation means of which the gallery 69 comprises input port means and interfaces between the bearing surface and both output port means. Thus for the aforementioned exemplary clockwise rotation of shaft 5, the viscosity pump 64 draws lubricant from the bath and delivers it at elevated pressure to the gallery 69 in which it is made available to all bearing pads 26 and forced onto the bearing surfaces thereof, from which it returns directly to the lubricant bath. Forced lubrication is therefore also provided by simple inboard viscosity pumping means with few additional modifications. If and when the shaft rotation reverses the pump 65 effects the same operation of supplying lubricant from the bath to the annular gallery 69.

It will be appreciated that as the pumps 64 and 65 function irrespective of shaft rotational direction it may be undesirable for one pump to be withdrawing lubricant from the gallery that is supplied by the other pump. To this end the second duct means 67 may include one-way valve means 72 operable to prevent lubricant from being drawn from the annular gallery 69 by either pump. Conveniently, the one-way valve means comprises for each said duct $68_1$ and $68_2$ a ball 73 contained in a vertically extending section of the duct above an apertured valve seat 74 to which it is biased by gravity to close off the duct and responsive to a positive pressure differential between the pump and gallery 69 to be lifted from the seat and permit lubricant flow along the duct. Thus notwithstanding the direction of shaft rotation only one pump at a time supplies lubricant to the gallery 69.

If a bearing structure is chosen which has both supply ducts coupled to the gallery at substantially the same point or by way as a common duct, the one-way valve means may be provided by a shuttle valve responsive to the highest positive pressure to shut off the other duct.

The second viscosity pump set 33 thus occupies the other part of the stator surface about the shaft axis and accounts for the other 180° of stator periphery surface about axis 6 with the limited stator space available for the viscosity pump means.

As an example of the benefit achieved by providing pumped cooling of lubricant by such simple viscosity pump means, it has been found that for typical vertical bearing assemblies of the form shown in FIG. 1 the power envelope is such that to maintain a lubricant bath temperature of 80° C. whilst supporting a thrust load of 1.7 MPa, bearing assemblies for shafts of diameters 60 mm and 140 mm permit maximum sustained operating speeds of 2500 rpm and 1800 rpm respectively.

Figure 3:
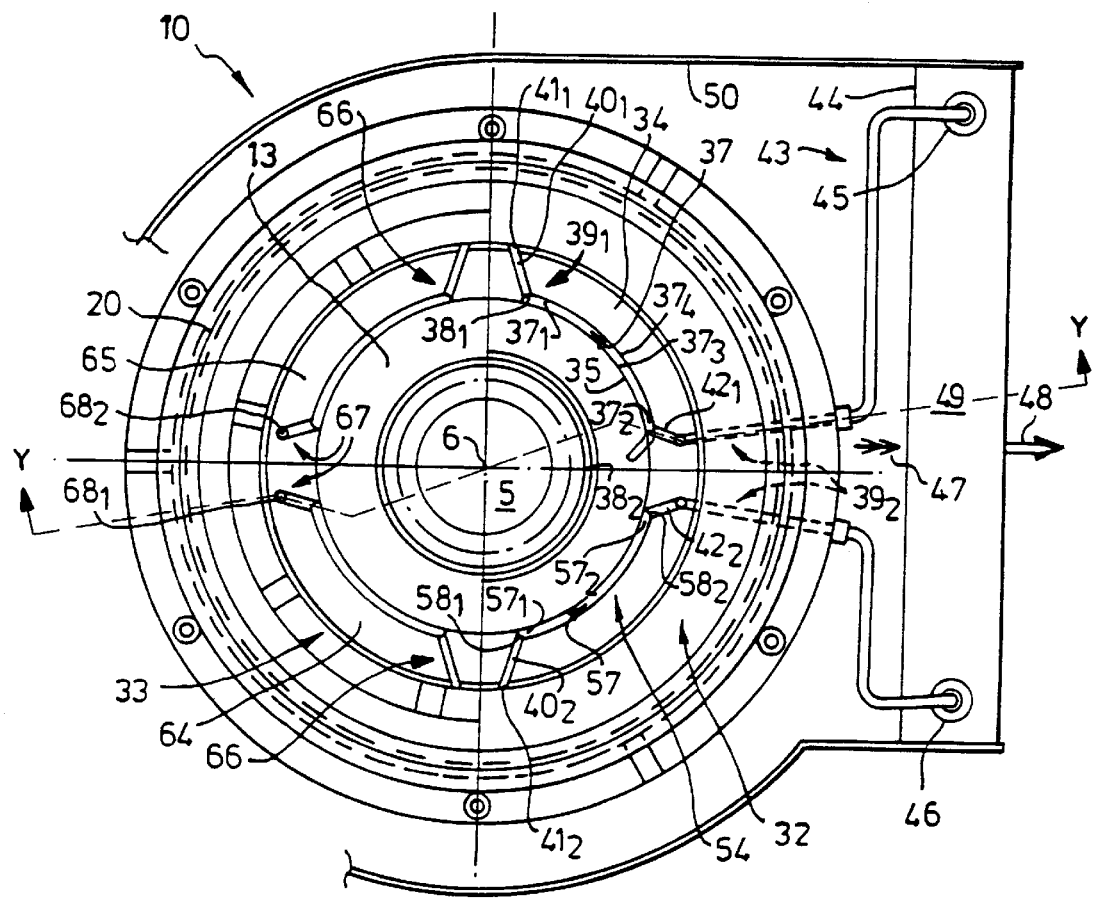
FIG. 3 is a cross-section through part of the assembly of FIG. 2($a$) along the line X—X thereof showing the viscosity pump means and duct means coupling it to the heat exchanger means, FIGS. 4($a$) to 4($f$) are schematic representations of variants on the above with possible connections between the viscosity pump means and heat exchange means or forced lubrication means, FIGS. 5($a$) and 5($b$) are schematic sectional elevations showing alternative dispositions of viscosity pump pumping chamber recesses for pumps within the same set, and for different sets, respectively, and FIG. 5($c$) is a schematic sectional elevation showing an alternative disposition of viscosity pump at a radially extending, rather than axially extending, stator and rotor face, Referring to FIGS. 2($a$)–($c$) and 3 which show a vertical bearing assembly and shaft supported thereby, the parts thereof and reference numbers employed correspond to those of FIG. 1 described above. A lubrication arrangement 30 in accordance with the present invention is incorporated in such assembly.

A vertical bearing assembly having a lubrication arrangement including heat exchanger means in accordance with the present invention and of the form shown in FIGS. 2 and 3 having a viscosity pump chamber recess depth of 2–3 mm and axial width of about 15 mm was found to permit sustainable speeds of 6500 rpm and 3000 rpm for the same range of shaft diameters. This is of particularly practical importance as it permits such shafts to be rotated by rotors synchronised to the local mains frequency of 50 Hz or, for some diameters, 60 Hz.

It will be appreciated that the above described embodiment may be varied in several respects without departing from the invention.

The lubrication arrangement may comprise only one lubricant utilisation means, that is, either heat exchanger means or a force lubricated bearing part but not both, thereby enabling each viscosity pump to extend further about the shaft or to operate several such pumps in parallel.

The heat exchanger means insofar as it comprises lubricant utilisation means may be connected to the first viscosity pump set and the lubricant bath in a manner similar to that described for a force lubricated bearing arrangement, namely with the first lubricant port means thereof connected to the second duct means $39_2$ and the second lubricant port means thereof connected directly to the lubricant bath.

Referring to FIG. 4(a) this illustrates schematically the arrangement 30 of FIGS. 2 and 3 in which the heat exchanger means 44 is connected in series between the first pump 34 and second pump 54. FIG. 4(b) illustrates the lubricated bearing part 25 connected by the way of second duct means 67 to both pumps 64 and 65 and by way of one-way valve means 72 and returning lubricant directly to the bath. FIG. 4(c) shows such a configuration employing the heat exchanger means 44 with the second lubricant port means 46 connected directly to the lubricant bath (terminating either above or below the surface) and the first lubricant port means 45 connected to the second duct means $39_2$ which includes one-way valve means 75 (shown as a shuttle valve) associated with each duct such that only one pump at a time circulates lubricant through the heat exchanger core dependent upon the direction of shaft rotation.

FIGS. 4(d) and 4(e) illustrates alternative forms in which each heat exchanger means 44 has two separate cores 49 and $49_1$ each connected to receive lubricant from a respective pump 34, 54 and return it directly to the bath. If the second duct means includes one-way valve means 73, as in FIG. 4(d), and/or each second lubricant port terminates above the surface of the lubricant bath, only one heat exchanger core and one viscosity pump is operative at any one time, whereas without such valve means and with the second lubricant port terminating beneath the surface 27' of the lubricant bath, as in FIG. 4(e), both pumps and both heat exchanger cores operate for both directions of shaft rotation, albeit that the pump drawing lubricant through the heat exchanger core may be working at low efficiency.

It will be appreciated that if the shaft 5 rotates in one direction only for all or a substantial portion of its operations, it may be unnecessary for each viscosity pump set to include two viscosity pumps which respond to different rotation directions. In such an arrangement, and in accordance with the above outlined principles of flow rate efficiency, it may still be beneficial to have two circumferentially short pumping chamber recesses of maximum width and for the first port of each to be disposed as a leading port as illustrated in FIG. 4(f), the pumps then working in parallel and doubling the effective chamber width and thus the flow rate.

It will be appreciated that if appropriate, that is, if the pumping of lubricant to the relevant utilisation means by each set is capable of extending the power envelope beyond that required, it may be unnecessary to have lubricant pumped continuously and irrespective of shaft rotational direction. For example, if the shaft rotates in opposite directions with required frequency and duration, it may be possible for each viscosity pump set to respond effectively to one rotation direction only and idle or effectively idle during rotation in the opposite direction.

As described and illustrated in all the above embodiments, the viscosity pumps are all defined by stator surface recesses at substantially the same vertical position with respect to the lubricant bath and the recesses in series about the axis. If desired, and axial space permits, the recesses of the viscosity pump of a set may be defined vertically separated, as shown at $37_1$ and $57_1$ in FIG. 5(a), enabling each such recess to extend circumferentially further about the axis 6. It may be possible to maintain pumping chamber means width to a required value for each pump and rely upon extra circumferential length to facilitate the inclusion of further pumps or sets of pumps, or each recess may be made longer if necessary to increase delivery pressure. For some lubrication means, such as a bearing part which may benefit from a higher supply pressure at the expense of a lower delivery rate caused by narrower recesses, such an arrangement of pumping chamber recesses may be appropriate when stator area is limited, as in the vertical bearing assembly described in detail above. Alternatively, as illustrated in FIG. 5(b) the surface recesses associated with the viscosity pumps of any one set may share the same vertical position and the chambers of the viscosity pump sets, such as $32_1$ and $33_1$ may be separated vertically, and possibly of different widths.

Although defining the viscosity pumps at the outer periphery of such a rotor flange involves maximum linear rotor speed, such grooves may be defined within the stator facing other rotor surfaces. Referring to FIG. 5(c) the rotor surface 80 is defined by the radially extending face 15 of the collar flange and the facing stator surface 81, in which one or more pumping chamber recesses 82 are formed, is defined instead of a reverse thrust bearing 24. Different recesses of a pump set or of different sets may be defined at different radial positions.

As described, the surface recess of each chamber which defines a pumping chamber is substantially regular in width and depth for ready machining as are the simply curved end regions. It will be understood that each such recess may be of more complex shape to improve efficiency, as may the forms and positioning of the ports and duct means. The first and second ports to each recess may be arranged to extend substantially tangentially with respect to the rotor and blend more uniformly with respect to the base of the recess. Where two end regions of adjacent pumps are located closely, as seen in FIG. 3, the ports of adjacent recesses may be oppositely inclined with respect to the plane of the drawing so as to cross each other whilst retaining a more tangential line.

It will also be appreciated that the heat exchanger means may take other forms both without, and possibly within, the housing. It will be appreciated that if desired the coolant could be caused to flow through a folded or multi-tubed core by way of well defined ports forming the coolant inlet and outlet means whilst the lubricant flows over and between the faces of the core by way of such less well defined lubricant ports. Such a configuration permits use of a coolant which requires constraining within such tube work. Whereas indefinitely defined lubricant ports may be of limited practicality without the housing, such a configuration may be employed within the housing with such heat exchanger core being disposed in or above the lubricant bath and the first and second duct means arranged to extract lubricant from adjacent one face of the core and return it adjacent to the other face such that a flow of lubricant across the core is effected.

Whereas the provision of cooling and/or forced lubrication is effected within a bath of lubricant provided to lubricate bearing parts which hitherto have needed submerging in the possibly provided lubricant, it may be possible by forced lubrication to operate with a reduced quantity of lubricant such that some bearing part, such as 25 in FIG. 2, is not fully immersed and relies upon lubricant being pumped thereto in operation.

I claim:

1. A bearing assembly for a vertically oriented shaft including a lubrication arrangement, said bearing assembly comprising a housing containing a rotor part carried by the shaft and a stator part surrounding the rotor part, one or more bearing parts formed between the rotor and stator parts, said lubrication arrangement comprising a bath of lubricant for the bearing parts, viscosity pump means comprising at least one viscosity pump set and each set comprising at least a first viscosity pump defined by a rotor surface of the assembly submerged in said lubricant and a facing submerged stator surface containing a first surface recess extending part way about the rotor axis between first and second ports located at opposite end regions of the recess, whereby rotation of the rotor relative to the stator surface entrains lubricant to flow in the direction of said rotation between a leading one of said first and second ports and a trailing one of said first and second ports, and, associated with each said viscosity pump set, first duct means extending between said first port of each pump and an opening submerged in the lubricant bath and second duct means extending between said second port of each pump and lubricant utilization means, said facing rotor and stator surfaces being non bearing surfaces spread apart submerged in said lubricant by a substantially fixed distance in excess of the thickness of a hydrodynamic, load bearing film of the lubricant.

2. An arrangement as claimed in claim 1 in which the viscosity pump means includes at least two viscosity pump sets, a first set being associated with lubricant utilisation means comprising heat exchanger means and a second set being associated independently thereof with lubricant utilisation means comprising a force lubricated bearing part of the bearing assembly.

3. An arrangement as claimed in claim 1 in which the lubricant utilisation means comprises heat exchange means having first lubricant port means connected to the second duct means of said first viscosity pump and second lubricant port means connected directly to the housing bath and coolant inlet and outlet means.

4. An arrangement as claimed in claim 1 in which at least one viscosity pump of at least one set has associated therewith one-way valve means operable to prevent flow of lubricant between the lubricant utilisation means and the viscosity pump when the direction of rotor rotation defines the second recess port as the leading port.

5. An arrangement as claimed in claim 4 in which each one-way valve means is included in the second duct means.

6. An arrangement as claimed in claim 5 in which said one-way valve means comprises at least one ball adapted to be contained in said duct means vertically above an apertured valve seat and is responsive to a positive pressure difference between the pump and lubricant utilisation means to be lifted from the seat and permit lubricant flow along the duct means.

7. An arrangement as claimed in claim 1 in which at least one viscosity pump set comprises also a second viscosity pump, defined by said submerged rotor surface and part of said facing submerged stator surface containing a second surface recess therein extending between first and second ports located at opposite end regions of the recess, whereby rotation of the rotor relative to the stator surface entrains lubricant to flow in the direction of said rotation between a leading one of said first and second ports and a trailing one of said first and second ports, said first duct means extends between said first port of the second pump and an opening submerged in the lubricant and said second duct means extends between said second port and heat exchanger means, said recess ports of the pumps being disposed with respect to each other such that a particular rotational direction of the rotor defines as the leading ports of the pumps the first recess port of one pump and the second recess port of the other pump, and said second duct means associated with at least one viscosity pump set extends between the second port of the first viscosity pump of the set and the first lubricant port means of the heat exchanger means and extends between the second port of the second viscosity pump of the set and the second lubricant port means such that said lubricant flows to and from said heat exchanger means by way of two viscosity pumps of the set.

8. An arrangement as claimed in claim 1 in which for at least one viscosity pump the rotor surface is defined by an axially extending periphery of the rotor.

9. An arrangement as claimed in claim 1 in which said rotor surface is defined on a radially extending thrust bearing collar of the bearing assembly at or near the periphery of the collar.

* * * * *